Sept. 5, 1950 E. F. BRILL 2,521,036
SHELF MECHANISM FOR REFRIGERATED DISPLAY CASES
Filed April 15, 1946 8 Sheets-Sheet 2

INVENTOR.
EDWARD F. BRILL
BY
Brown, Jackson, Boettcher & Dienner
Attys.

Sept. 5, 1950     E. F. BRILL     2,521,036
SHELF MECHANISM FOR REFRIGERATED DISPLAY CASES
Filed April 15, 1946     8 Sheets-Sheet 3

INVENTOR.
EDWARD F. BRILL

Sept. 5, 1950            E. F. BRILL            2,521,036

SHELF MECHANISM FOR REFRIGERATED DISPLAY CASES

Filed April 15, 1946            8 Sheets-Sheet 6

*INVENTOR.*
EDWARD F. BRILL
BY
*Attys.*

Sept. 5, 1950            E. F. BRILL            2,521,036

SHELF MECHANISM FOR REFRIGERATED DISPLAY CASES

Filed April 15, 1946            8 Sheets-Sheet 7

INVENTOR.
EDWARD F. BRILL
BY
Brown, Jackson, Boettcher & Dienner
Attys.

Sept. 5, 1950            E. F. BRILL            2,521,036

SHELF MECHANISM FOR REFRIGERATED DISPLAY CASES

Filed April 15, 1946            8 Sheets-Sheet 8

INVENTOR.
EDWARD F. BRILL
BY
Attys.

Patented Sept. 5, 1950

2,521,036

UNITED STATES PATENT OFFICE 2,521,036

SHELF MECHANISM FOR REFRIGERATED DISPLAY CASES

Edward F. Brill, Milwaukee, Wis.

Application April 15, 1946, Serial No. 662,396

22 Claims. (Cl. 62—89.5)

This invention relates, in general, to refrigerated display cases, and has particular relation to a shelf mechanism for self-service refrigerated display cases for frozen foods of the type more fully disclosed and claimed in my copending application Serial No. 662,395, filed April 15, 1946.

In the refrigerated display case of my above identified application, the packages of merchandise are displayed on refrigerated shelves directly before the customer and can be conveniently removed without opening refrigerator doors or the like. The packages act by cooperation with the refrigerated shelves and vertical partitions or spacers to seal the case against circulation of air into the refrigerated part of the case through the open front of the case through which access is had to the merchandise. The case of my above identified application also has compartments at the bottom of the case.

While the particular shelf mechanism which I shall describe hereinafter in connection with the drawings is a shelf mechanism adapted for use with the refrigerated display case of my above identified application, it is to be understood that it is not limited to such use but may be employed in connection with other cases, cabinets or the like, and elsewhere as suitable and desired.

One of the main objects of the present invention is to provide an improved refrigerated shelf unit that can be made and assembled into a unitary assembly and which can have the connections between the refrigerated shelves completed all outside the case, and a refrigerated shelf unit of the character described that can be shipped and handled as a unitary assembly independent of the case and conveniently slipped or installed into the case for use.

Another object of the invention is to provide a refrigerated shelf mechanism in which the refrigerated shelves are adjustable vertically and relative to each other whereby to adjust the vertical spacing of the shelves for packages of different sizes; also a refrigerated shelf unit in which the refrigerant containing coils or other parts of the refrigerated shelves are connected in a manner to permit the aforesaid adjustment of the shelves vertically and relative to each other.

Another object of the invention is to provide a refrigerated shelf unit of the class described having vertical partitions or spacers adjustable sidewise of the case for packages of different sizes and adapted to permit vertical adjustment of the refrigerated shelves; also facing members for the front ends of the vertical partitions or spacers, which spacing members are also adapted for adjustment vertically and sidewise of the case.

Another object of the invention is to provide in a refrigerated shelf unit of the class described walls along the sides and rearmost edges of the group of packages, which walls are also adapted to permit vertical adjustment of the shelves.

Another object of the invention is to provide an improved hanger type mounting which will permit the shelf unit to be readily slipped into place in the case; also an improved mounting of the refrigerated shelves on the framework of the shelf unit.

Another object of the invention is to provide a refrigerated shelf unit adapted for use with a unit seal between the shelf unit and the adjacent walls of the outer housing of the case to seal the case against circulation of air into the refrigerated part of the case around the outer periphery of the removable shelf unit when the shelf unit is in position within the case.

Another object of the invention is to provide a refrigerated shelf unit adapted for use with a unit seal between the shelf unit and a door for an underlying compartment to seal the case against circulation of air into the refrigerated part of the case.

Another object of the invention is to provide improved means for readily and conveniently adjusting the refrigerated shelves vertically and relative to each other, and, more particularly, shelf adjusting means comprising vertically extending racks and pinions carried by the refrigerated shelves and meshing with the racks whereby the shelves are supported by the meshing pinions and racks, and the pinions are adapted to be turned to adjust the positions of the shelves.

Another object of the invention is to provide an improved form of canopy for ready application and suspension over the open front of the case when the refrigerated shelf units are in place.

Another object of the invention is to provide means for eliminating frosting or accumulation of frost on parts of the case.

Another object of the invention is to provide a refrigerated shelf mechanism having various features of novelty and advantages, and which will function in an improved manner and overcome problems previously presented.

Further objects and advantages of the invention will become apparent from the following detailed description, taken in connection with the accompanying drawings in which.

Referring now to the drawings, the particular form of self-service refrigerated display case selected for illustration comprises an outer housing 10 comprising an insulated top wall 11, an insulated back wall 12, an insulated bottom wall 13 and insulated side walls 14. The case is open at the front, except as will hereinafter appear.

Each wall 11, 12, 13 and 14 comprises an outer metallic shell 15 and an inner metallic shell 16. These shells may be formed of steel, aluminum or other suitable material. A framework may be provided of wood, for example, as shown at 17. The space between the shells 15 and 16 is filled with insulating material 18, for example, compressed granulated cork insulation or other suitable insulating material.

An insulating partition 20 extends vertically within the outer housing 10 and divides the interior of the same into compartments 21 and 22. The compartments 21 and 22 are thermally insulated from each other by the partition 20 to permit different temperatures in these compartments.

Figure 1:
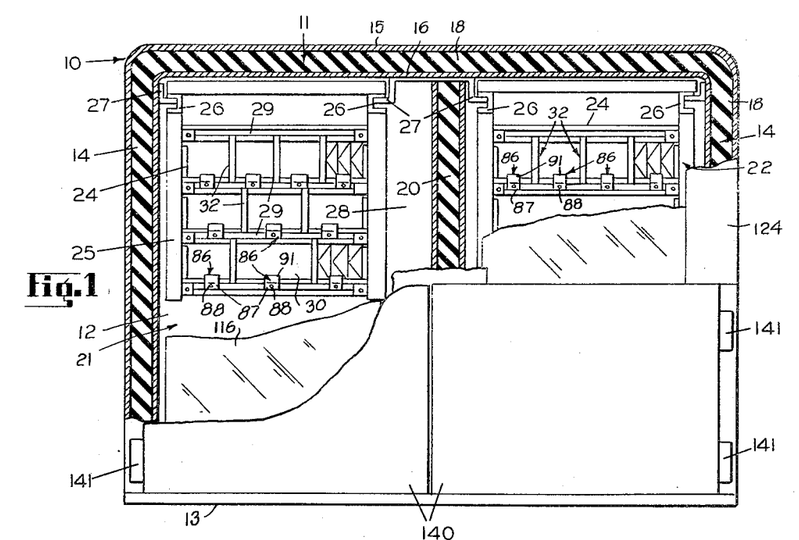
Figure 1 is a front elevational view of a refrigerated display case employing refrigerated shelf units embodying the present invention, the case being partially broken away and in section.

Each compartment 21 and 22 is adapted to have a refrigerated shelf unit 24 positioned in its upper portion and directly before the customer. The refrigerated shelf units 24 have shelf supporting frames 25 provided along the top of each unit with horizontally extending members 26 of channel or U-shaped section which are adapted to slide into and out of engagement with angular hangers 27 carried by the interior of the housing 10 at or near the tops of the respective compartments 21 and 22 as best shown in Figure 1. The hangers 27 support the shelf units 24 in suspended position directly before the customer. The refrigerated shelf unit 24 can be made up complete in unitary assemblies outside the outer housing 10, and they can be shipped independently of the housing 10 and inserted into the housing 10 by merely slipping them into place.

As the case is shown in section in Figure 1, the shelf unit 24 in the compartment 21 is spaced at 28 from the left hand side of the partition 20 to provide space for the reception of reject packages, as will hereinafter appear.

Each shelf unit 24 comprises a plurality of vertically spaced and horizontally extending refrigerated shelves 29 for supporting, for example, packages 30 (Figure 7) of frozen food in rearwardly extending rows, with the upper and lower surfaces of the packages cooperating with the lower and upper surfaces respectively of the shelves 29 to seal the case against the circulation of air into the refrigerated part of the case along the upper and lower surfaces of the packages 30. Upright partitions 32 extend vertically between the shelves 29 and between the packages 30 of adjacent rows of packages and cooperate with the sides of the packages to seal the case against circulation of air into the refrigerated part of the case along the side surfaces of the packages.

Figure 16:
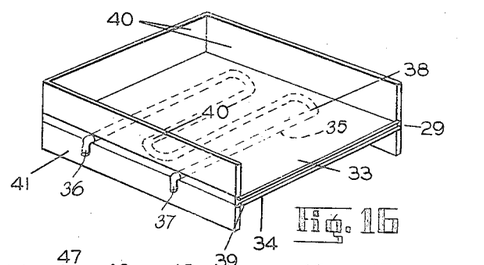
Figure 16 is a vertical sectional view taken from front to rear of one of the refrigerated shelves, showing one manner of providing metal borders or marginal walls along the sides and back of the shelf at the top and bottom thereof.
Figure 17:
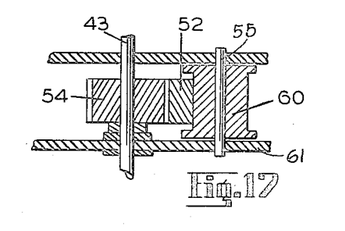
Figure 17 is a fragmentary vertical section taken on the line 17—17 of Figure 18.
Figure 23:
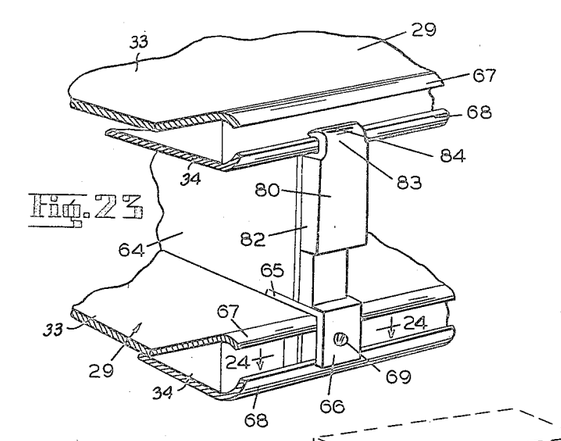
Figure 23 is a fragmentary perspective view of the front ends of a pair of the refrigerated shelves partially in section and showing the adjacent upright partition and the vertically adjustable facing member therefor.
Figure 24:
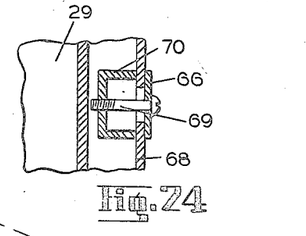
Figure 24 is a fragmentary vertical section taken on the line 24—24 of Figure 23.

Each refrigerated shelf 29 comprises upper and lower metallic shells 33 and 34, respectively, (Figure 16) between which a refrigerant coil 35 is concealed. The coil 35 of each shelf 29 has a refrigerant inlet 36 and a refrigerant outlet 37. A metallic tray-like or pan-like member 38 is secured to the upper surface of the upper shell 33, for example, by tack or spot welding it to the shell 33. A similar tray-like or pan-like member 39 is secured to the bottom surface of the lower shell 34, for example, by tack or spot welding it to the shell 34. As shown in Figure 16, the member 38 has upstanding flanges 40 along its rear and opposite side edges. The member 39 has similar depending flanges 41 along its rear and side edges. The side flanges 40 and 41 fit over and against the outer surfaces of the outermost rows of packages and the rear flanges fit over and against the rear surfaces of the rearmost packages.

Figure 10:
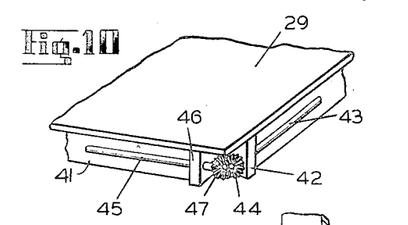
Figure 10 is a fragmentary perspective view of one of the rear corners of one of the refrigerated shelves showing the adjacent parts of the shelf adjusting means.
Figure 11:
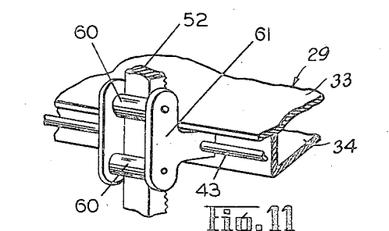
Figure 11 is a fragmentary perspective view of one side of one of the refrigerated shelves showing the adjacent parts of the shelf supporting and shelf adjusting means.
Figures 15, 18, 19, 20, 21, 22:
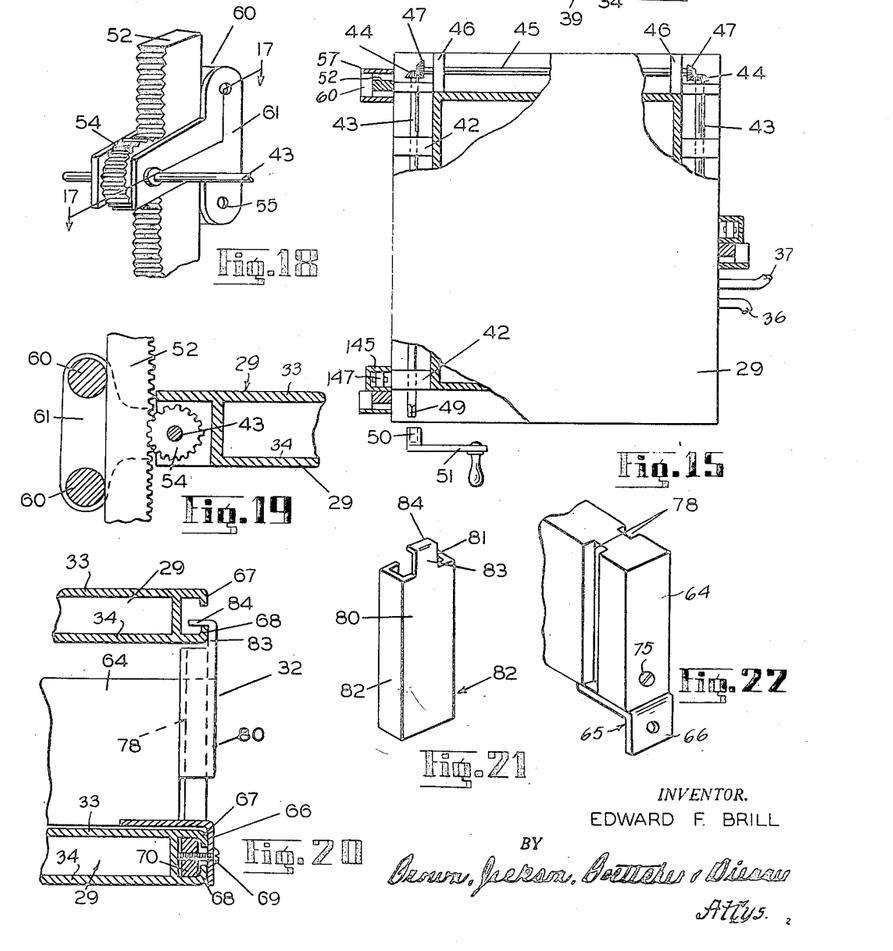
Figure 15 is a top plan view of one of the refrigerated shelves partially broken away to show the adjusting means therefor.
Figure 18 is a fragmentary perspective view of one of the rack and pinion sets for supporting and adjusting the refrigerated shelves.
Figure 19 is a fragmentary vertical section through one side of one of the refrigerated shelves, showing the adjacent rack and pinion, and the adjacent rollers in section.
Figure 20 is a fragmentary vertical detail section through the front ends of a pair of the refrigerated shelves, showing the upright partition and facing members.
Figure 21 is a perspective view of one of the facing members for the front ends of the upright partitions.
Figure 22 is a fragmentary perspective view of the front end of one of the upright partitions.

As shown in Figures 10 and 15, the opposite sides of each shelf 29 has blocks 42 fixed thereto. Shelf adjusting shafts 43 extend along the opposite sides of each shelf 29 for rotation in the blocks 42. The inner ends of the shafts 43 have miter or bevel gears 44 fixed thereon. A connecting shelf adjusting shaft 45 extends along the rear of each shelf 29 for rotation in blocks 46 fixed to the shelves. Each shaft 45 has bevel or miter gears 47 fixed on its opposite ends and meshing with the gears 44 so that by turning one shaft 43 the other two shafts for the particular shelf 29 will turn therewith. The outer end of one of the shafts 43—preferably the shaft 43 adjacent the outer side walls of the housing 10—has a polygonal end 49 (Figure 15) for engagement by a corresponding socket 50 in removable crank 51 which may be applied to turn the shafts 43 and 45 of the respective shelves selectively as desired.

Extending vertically within the compartments 21 and 22 are stationary racks 52, there being, for example, two of such racks 52 in spaced relation at the outer sides of the shelf units 24, and one of such racks 52 at the inner side of each shelf unit 24 in position intermediate the outer racks in a direction rearwardly of the case. The shafts 43 have fixed thereon pinions 54 one adjacent and meshing with each rack 52. This provides in effect a three point support for each shelf 29. By applying the crank 51 and rotating the shafts 43 and 45, the pinions 54 are rotated and, by their engagement with the racks 52, move the shelf upwardly or downwardly depending upon the direction of rotation to adjust the vertical spacing of the shelves 29 for packages of different sizes.

The refrigerant coils 35 of the shelves 29 are connected, for example, in series by suitable flexible tubing to permit relative movement between the shelves 29 in adjusting the same vertically. The flexible tube connections comprise flexible tubes 56, one connected, for example, between the refrigerant supply system 57 and the refrigerant inlet of the upper shelf, another flexible tube 56 connected between the outlet of the upper shelf and the inlet of the third from the top shelf, another flexible tube 56 connected between the outlet of the third from the top shelf and the inlet of the second from the top shelf, another flexible tube 56 connected between the outlet of the second from the top shelf and the inlet of the bottom shelf, and another flexible tube 56 connected between the outlet of the bottom shelf and the refrigerant supply system 57. The connections described permit the use of flexible tubes 56 which are not excessively flexible, but the particular form or order of the connections may vary. For example, where the flexibility of the tubes 56 will permit, the outlet of the upper shelf may be connected to the inlet of the second from the top shelf, with the outlet of the second from the top shelf connected to the inlet of the third from the top shelf, the outlet of the third from the top shelf connected to the inlet of the bottom shelf, and the outlet of the bottom shelf connected to the refrigerant supply system. The refrigerant supply system 57 is shown provided with a heat exchanger 58 for cooling the incoming liquid refrigerant and an expansion valve is shown at 59.

The racks 52 are held in proper engagement with the pinions 54 by rollers 60 rotating on shafts 55 carried by T-shaped members 61 mounted on the shafts 43 and 45. The rollers 60 engage the outer edges of the racks 52 and hold the teeth along the inner edges of the racks 52 in engagement with the pinions 54.

Figure 28:
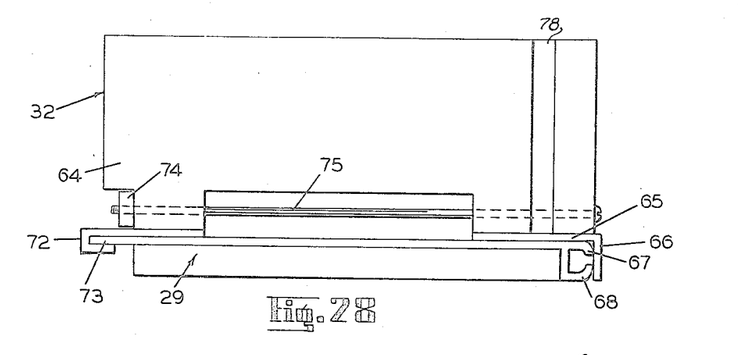
Figure 28 is a side elevational view of one of the refrigerated shelves showing fragmentarily the adjustable upright partition and its mounting on the shelf.

Each upright partition 32 comprises an upright wood partition member 64 (Figures 20 and 22) having rabbeted into and secured, for example by screws or the like (not shown), to the forward ends of the lower edges of the partition members 64 the horizontal legs of angular brackets 65. The depending vertical legs 66 of the brackets 65 extend down over flanges 67 and 68 extending downwardly and upwardly from the front edges of the shelves 29 and are secured removably and adjustably in place, for example, by cowl type fasteners comprising screws 69 and screw anchoring members 70. The rear ends of the partition members 64 are secured to the upper surfaces of their respective refrigerated shelves or cold plates 29, for example, by interlocking flanges 72 and 73 on the members 64 and shelves 29. The flanged member 72 has an upstanding lug 74 and the partition member 64 is secured to this lug 74 by a through bolt or threaded stem 75 (Figure 28). This mounting of the partition member 64 on the refrigerated shelves permits adjustment of the partition members sidewise of the case. Instead of using the type of fasteners shown at the front ends of the partition members, I contemplate terminating the legs 66 of the brackets 65 adjacent the lower ends of the downwardly extending flanges 67 and turning the lower ends of the legs 66 in into interlocking engagement with the flanges 67.

Each partition member 64 has in its opposite sides and near the forward end of the member 64 vertical grooves 78 for interlocking engagement with facing members 80 for the front ends of the respective partition members. The facing members 80 are of generally channel-shaped form in horizontal section as shown in Figure 21, and have inturned flanges 81 at the inner ends of their opposite sides for interlocking and vertical sliding engagement in the grooves 78.

The forward ends of the partition members 64 are preferably of reduced width or thickness in amount so that the sides 82 of the facing members 80 will lie flush with the sides of the partition members 64 rearwardly of the grooves 78. The outer or front side of each facing member 80 has, at its upper end, an integral upwardly extending lug 83 the upper end of which is turned in at 84 for hook engagement with the upwardly extending flange 68 extending along the front end of the overlying shelf 29 as shown in Figure 20.

When the shelves 29 are separated as shown in Figure 20 to increase the vertical spacing of the shelves for packages which are larger, at least vertically, as they are disposed in the case, the partition members 64 and facing members 80 have relative sliding movement in a vertical direction, and the facing members 80 close the front ends of the spaces above the members 64. Moreover, the facing members 80 present a finished appearance at the front of the case, and the sides of the members 80 have sealing cooperation with the sides of the outer or front ends of the foremost packages 30. The sides of the packages 30 also have sealing cooperation with the opposite sides of the partition members 64, all to the end of effectively sealing the case against circulation of air into the refrigerated part of the case.

Package stop members 86 are fastened to the front ends of the shelves 29 for removal from the shelves and for adjustment along the front ends of the shelves sidewise of the case. These stop members 86 are of angular form (Figure 8) with the depending legs 87 extending down over the flanges 67 and 68 along the front ends of the shelves 29 and adjustably secured in place, for example, by cowl type fasteners comprising screws 88 and screw anchoring members 89. The stop members 86 are adjustable along the front ends of the shelves 29 and sidewise of the case by loosening the screws 88, moving the stop members 86 to the desired position, and tightening the screws 88 to fix the stop members in adjusted position. The partitions 32 are similarly adjustable sidewise of the case and secured in adjusted position by the screws 69.

Figures 6, 7, 8:
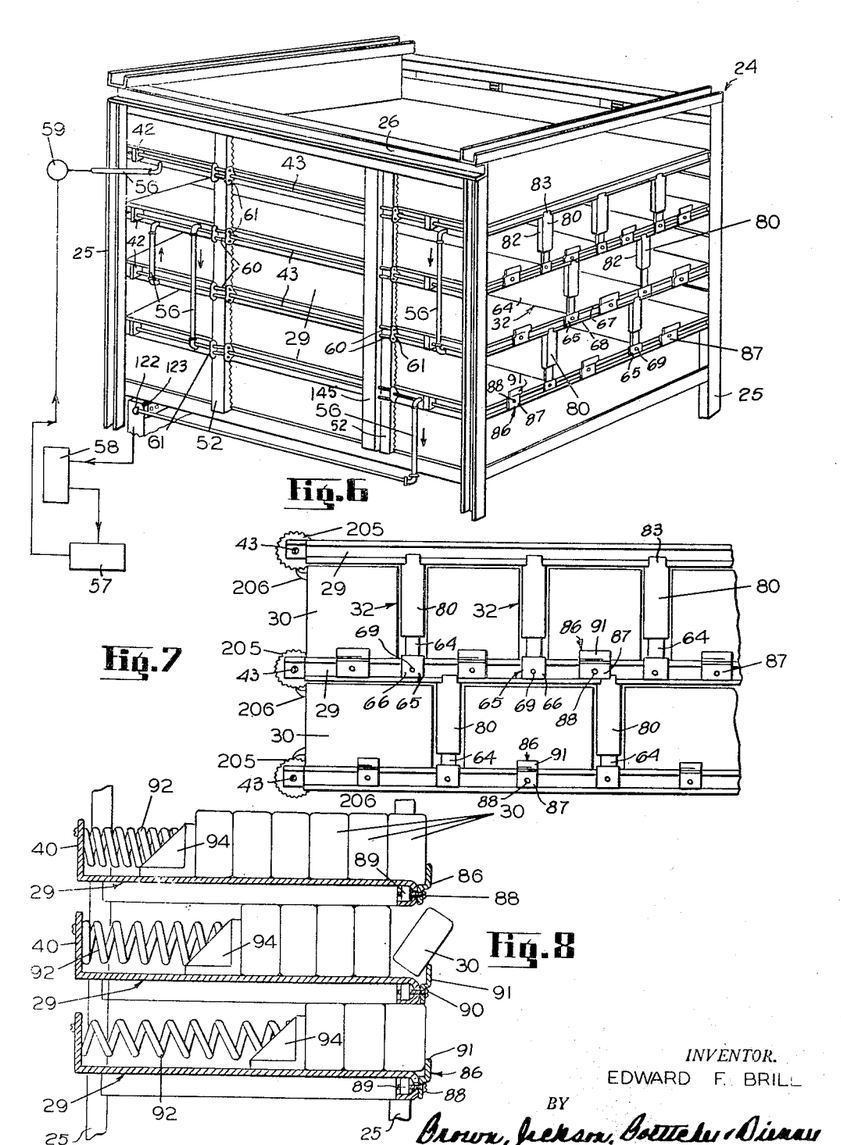
Figure 6 is a more or less diagrammatic perspective view of one of the refrigerated shelf units.
Figure 7 is a fragmentary front elevational view of the refrigerated shelf unit shown in Figure 6.
Figure 8 is a fragmentary view partially in elevation and partially in section showing several of the refrigerated shelves, the stop means for the foremost packages, the means for forcing the packages forwardly against the stop means, and the manner in which the packages are removed from the case.
Figures 25, 26, 27:
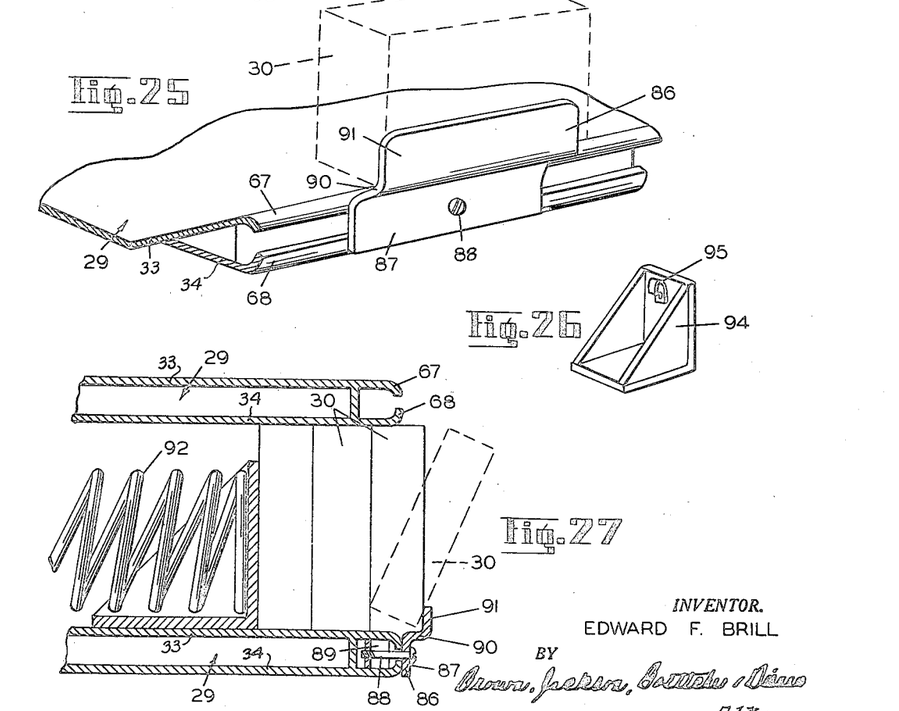
Figure 25 is a fragmentary perspective view of the front end of one of the refrigerated shelves, partially in section and showing one of the package stops adjustable along the front end of the shelf sidewise of the case.
Figure 26 is a perspective view of one of the follower members for cooperation with the rearmost package of one of the rearwardly extending rows of packages to force the foremost package against the package stop.
Figure 27 is a fragmentary vertical section through the front ends of a pair of the refrigerated shelves showing the front end of one of the springs for forcing the packages against the package stop.

At the upper ends of the depending legs 87 the stop members are turned out forwardly from the front ends of the shelves 29 at 90 (Figure 8). The outer ends of the outturned portions are turned upwardly at 91 to cooperate with the foremost surfaces of the foremost packages 30 near the bottoms thereof. The means for yieldingly forcing the packages 30 forwardly against the stops 91 comprise a plurality of coiled springs 92, one for each rearwardly extending row of packages 30. As shown in Figure 8, the springs 92 are interposed or confined endwise between abutment members (which may be the upwardly extending rear walls 40 of the refrigerated shelves) and follower members 94 (Figures 8 and 26) which act against the rearmost packages 30. The forward ends of the springs 92 may be suitably secured to the followers 94, for example by lugs 95 on the follower members, as shown in Figure 26.

Figure 34:
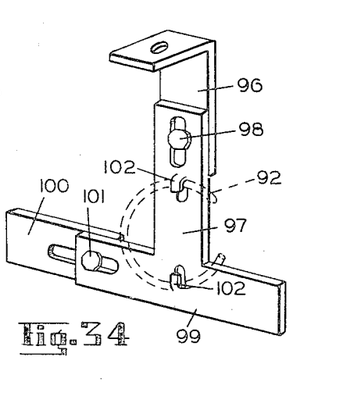
Figure 34 is a detail perspective view showing one manner of anchoring the springs for forcing the packages against the package stops.
Figure 35:
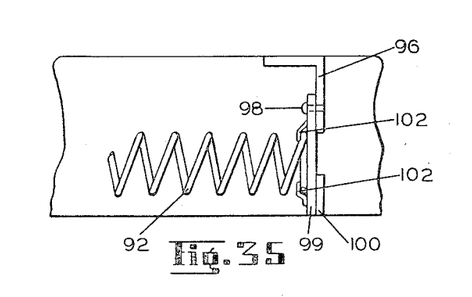
Figure 35 is a view showing fragmentarily in side elevation the spring and spring anchoring means shown in Figure 34.

For the purpose of holding the springs 92 in their desired rearwardly extending positions and against bowing out of such positions, I provide, as shown in Figures 34 and 35, between the convolutions of the springs and at suitable rearwardly spaced positions, brackets 96 and 97 adjustable vertically at 98. The bottom 99 of the bracket 97 is adjustable horizontally with respect to a bracket 100, for example, at 101. The bracket 97 has lugs 102 engaging the convolutions of the spring 92 within its length.

As shown in Figure 8, the stops 91 stop the foremost ends of the foremost packages 30 in position extending from the front ends of the refrigerated shelves 29 and partitions 32 and outer side walls 40 and 41 to permit the foremost ends of the packages 30 to be conveniently grasped and removed from the case, for example, by tilting the same as shown in Figure 8. The rearmost packages 30 may be dummy packages fastened to the followers 94, or of a rearwardly extending dimension to prevent their removal from the case. Such dummy packages will serve to seal the rearwardly extending package compartments after the last package from any of such compartments or any rearwardly extending row of packages has been removed. Where dummy packages are used as described, their outer surfaces may be marked to show that the particular package compartment in which the dummy package operates is empty when the dummy package is exposed to view at the front of the case.

Figures 37, 38:
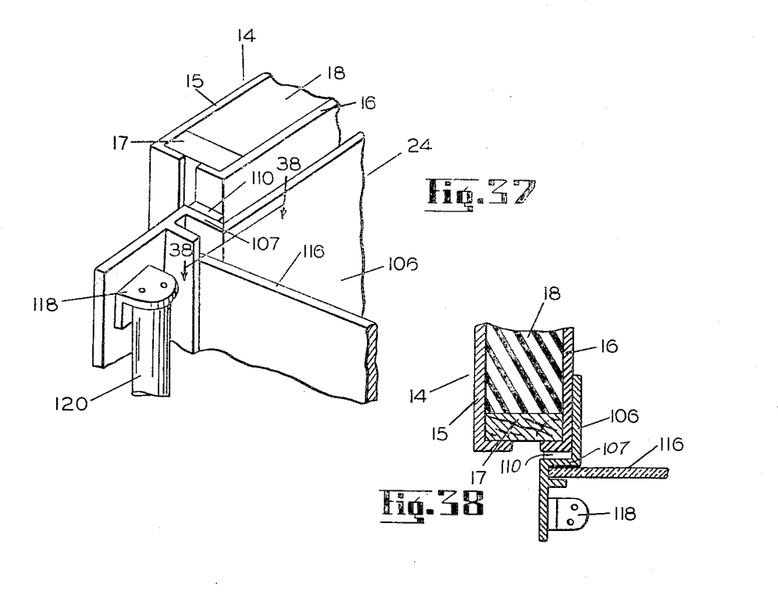
Figure 37 is a fragmentary perspective view partially in section showing the front end of one of the insulated side walls of the outer housing and the adjacent part of the unit support and unit seal.
Figure 38 is a fragmentary horizontal section taken on the line 38—38 of Figure 37.
Figure 39:
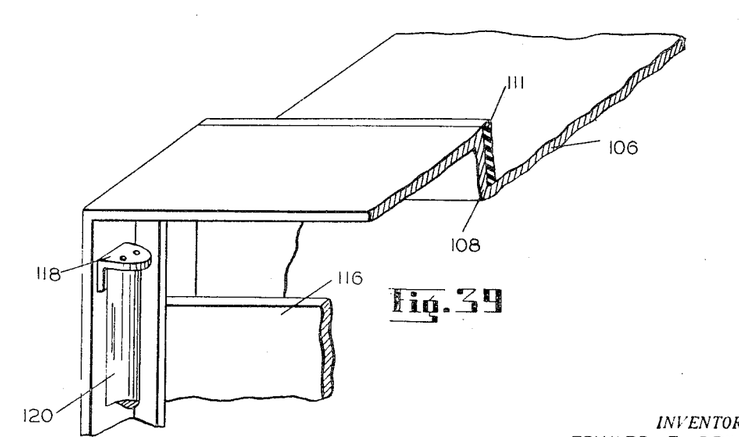
Figure 39 is a fragmentary perspective view, partially in section, showing one of the upper front corners of the unit seal.

Each shelf unit 24 has a support 106 (Figures 37, 38 and 39) preferably formed of extruded plastic material or other suitable material which will eliminate or minimize frosting. These supports 106 extend laterally or overlap at 107 the front ends of the upright side walls 14 of the outer insulated housing 10 when the shelf units 24 are in place in the case. The supports 106 also have upwardly extending portions which overlap at 108 (Figure 39) the front end of the top wall 11 of the insulated outer housing 10. Sealing strips or gaskets 110 extend vertically between the front ends of the side walls 14 and the laterally extending portions 107 of the supports 106 and, with a sealing strip or gasket 111 extending horizontally between the front end of the top wall 11 and the overlapping portion 108 of the support 106, provide at the open front of the case unit seals, which unit seals extend about the upper and outer sides of the refrigerated shelf units 24.

Depending vertically from the top of the case 10 within the reject package space 28 is a reject package receptacle part as more fully disclosed in my copending application Serial No. 662,395, filed April 15, 1946. Sealing strips or gaskets are preferably interposed between this reject package receptacle and overlapping portions of the supports 106 to complete the unit seals along the inner sides of the refrigerated shelf units when these units are in place in the case.

The support 106 has channel portions at opposite sides for receiving a transparent pane 116 of glass, "Plexiglas" or other suitable transparent material when the pane 116 is raised to closed position. The support 106 also carries mounting brackets and terminal members 118 for lamp tubes 120 of the fluorescent type, one disposed vertically along each of the opposite sides of each of the removable shelf units 24. Additional fluorescent tubes may be provided at the top or elsewhere as desired.

Each shelf unit 24 preferably has a cold or refrigerated plate 122 hinged along the bottom of the rear end thereof at 123 as shown in Figure 6. The cold plates 122 each comprise outer shelf parts within which is concealed a refrigerant coil in the manner in which the coils 35 are concealed in the shelves 29. The cold plates 122 of the two respective units 24 are adapted to be held in their horizontal positions for shipment as shown in dotted lines in Figure 6, and to be swung downwardly to the positions shown in full lines in Figure 6 to provide refrigerated inner vertical walls at the rear ends of the compartments underlying the shelf units 24.

Figure 3:
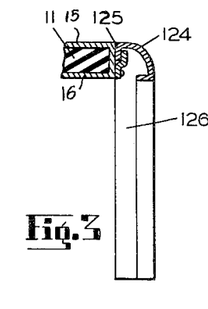
Figure 3 is a fragmentary vertical detail section taken on the line 3—3 of Figure 2.
Figure 29:
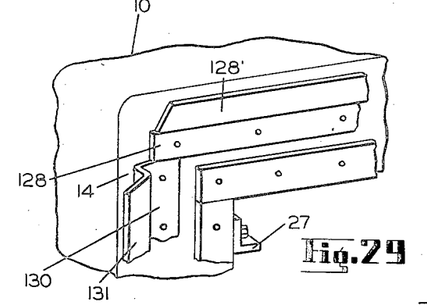
Figure 29 is a fragmentary perspective view showing one of the front corners of the insulated outer housing and the brackets for the canopy part of the outer housing.
Figure 30:
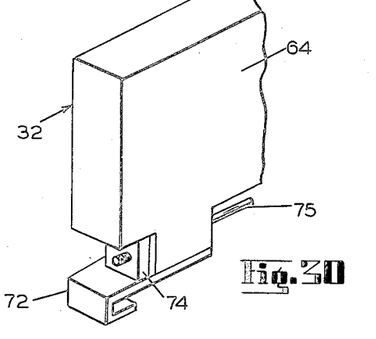
Figure 30 is a fragmentary perspective view of the rear end of one of the upright partitions, showing one form of means for securing same to its refrigerated shelf for sidewise removal and adjustment.

The front of the case adjacent the front ends of the shelf units 24 is provided with a metallic or other suitable canopy 124 provided (Figure 3) with a flange 125 extending horizontally along the top of its inner marginal edge and a pair of flanges 126 extending vertically along the outer sides of its inner marginal edges. The inner end of the top wall 11 of the outer housing 10 has a bracket 128 (Figure 29) secured thereto and provided with a flange 128' for receiving the flange 125 and, by cooperation therewith, supporting the canopy 124 and holding its upper end tightly to the housing 10. The inner ends of the side walls 14 have vertically extending brackets 130 secured thereto. The brackets 130 are provided with flanges 131 for receiving the flanges 126 and guiding the canopy 124 into place and holding its outer margins to the side walls 14 of the housing 10. The canopy 124 is applied by sliding it downwardly into place after the removable shelf units are completed with their flexible tube connections between the refrigerated shelves and the units are installed in the case. The canopy 124 is removed by sliding it upwardly to removed position.

Figure 2:
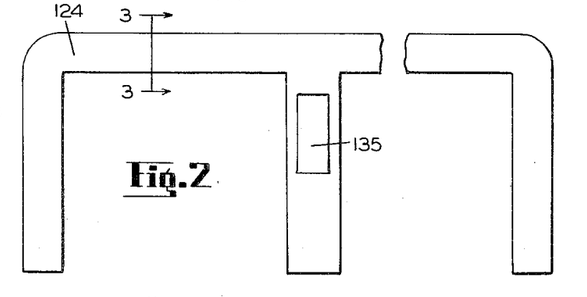
Figure 2 is a front elevational view of the canopy for the front of the case.

The front wall of the canopy 124 has a reject package receiving opening 135 (Figure 2) in register with the reject package receiving receptacle. The opening 135 is closed by a door or cover which is hinged and operates in the manner more fully disclosed in my copending application Serial No. 662,395, filed April 15, 1946. Reject packages are disposed of by the customer by inserting them through the reject opening 135, the door swinging inwardly to open position by engagement of the package therewith and the package being thus delivered into the reject package receiving receptacle. In servicing the machine, the reject packages are removed from the reject package receptacle and reintroduced into the package compartments of the refrigerated shelf units. The stop members 86 may be removed to facilitate filling and refilling the case.

The compartments beneath the refrigerated shelf unit 24 are provided with refrigerator doors 140. Each door 140 is hinged at its outer end at 141 to the outer housing 10. The inner meeting ends of the doors 140 have sealing strips which engage and seal the meeting ends of the doors without the necessity of a post or pillar between the meeting ends of the doors as more fully disclosed in my copending application Serial No. 662,397, filed April 15, 1946, now abandoned. Each door also has a handle (not shown) for releasing latch means and opening the door, as more fully disclosed in my last mentioned copending application. The shell structure insulation, framework, and other details of the door are also more fully disclosed in my copending application, and that disclosure will not be repeated here.

By reason of the engagement in the channeled portions of the support 106, the panes 116 would be broken if the doors were opened with the panes 116 in raised or closed position. Means is therefore preferably provided for preventing release of the latch means for holding the doors closed until the panes 116 are moved downwardly to open position within the doors 140. This means and the means for moving the panes upwardly to closed position and for holding the panes 116 in open position are all more fully disclosed in my last mentioned copending application.

Figure 9:
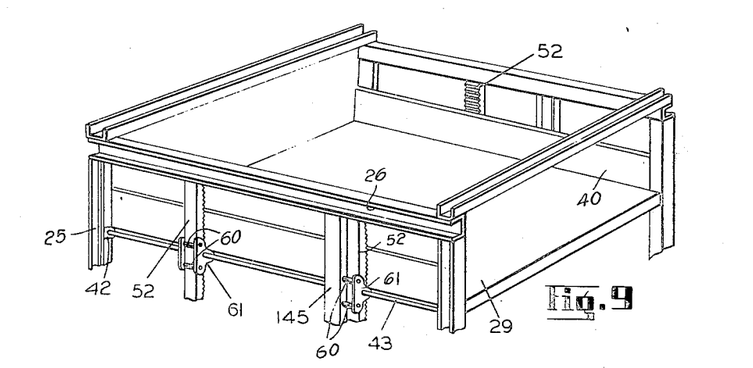
Figure 9 is a fragmentary perspective view of the top of the shelf unit shown in Figure 6.
Figures 12, 13, 14:
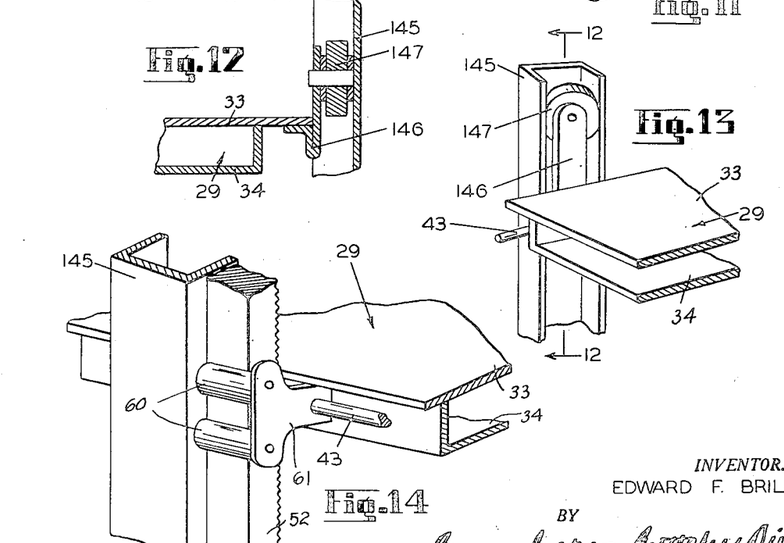
Figure 12 is a fragmentary vertical detail section taken on the line 12—12 of Figure 13.
Figure 13 is a fragmentary perspective view of one side of one of the refrigerated shelves showing one of the upright guide channels and one of the guide rollers cooperating therewith.
Figure 14 is a fragmentary perspective view of one side of one of the refrigerated shelves showing the adjacent parts of the shelf guiding and shelf supporting and adjusting means.

In Figures 9, 13 and 14 I have shown guide channels 145 along the opposite sides of the refrigerated shelves of the refrigerated shelf units. These guide channels 145 are carried by and constitute a part of the unitary shelf unit assemblies, including the framework, refrigerated shelves, flexible connecting tubes, vertical partitions, and stops, all of which may be completed and assembled outside the case and installed as a unitary assembly. The refrigerated shelves 29 carry brackets 146 at the sides thereof. Rollers 147 are carried by the brackets 146 (Figure 13), and these rollers operate in the guide channels 145 to guide the refrigerated shelves in their vertical adjustment.

Figure 31:
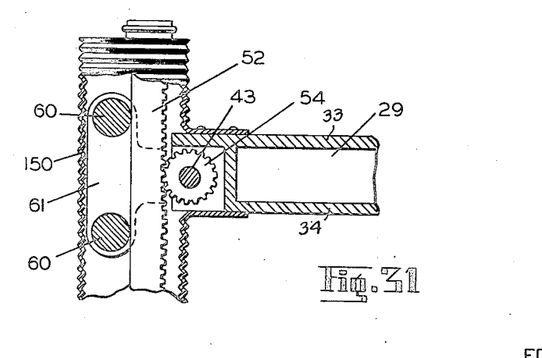
Figure 31 is a fragmentary vertical section through the side of one of the refrigerated shelves, showing the shelf supporting and adjusting means and means for preventing accumulation of frost thereon.

In Figure 31 I have shown a flexible jacket 150 of rubber, rubber-like, or other suitable material enclosing the brackets 61, rollers 60, pinions 54 and the adjacent portions of the racks 52 to prevent the accumulation of frost thereon. It is to be understood of course that other means than the rack and pinion means may be used for adjusting the shelves. Where worm means is used, the protecting jacket 150 will be arranged to cover the worm and adjacent cooperating means.

Figure 33:
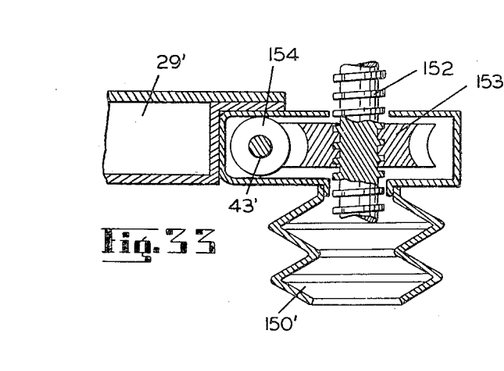
Figure 33 is a fragmentary vertical detail section showing another form of means for adjusting the shelves vertically.

In Figure 33 I have shown a worm 152 having a worm wheel 153 meshing with a worm wheel 154 on one of the shafts 43' for vertically adjusting the adjacent shelf 29'. The protecting flexible jacket is shown at 150'.

Figure 32:
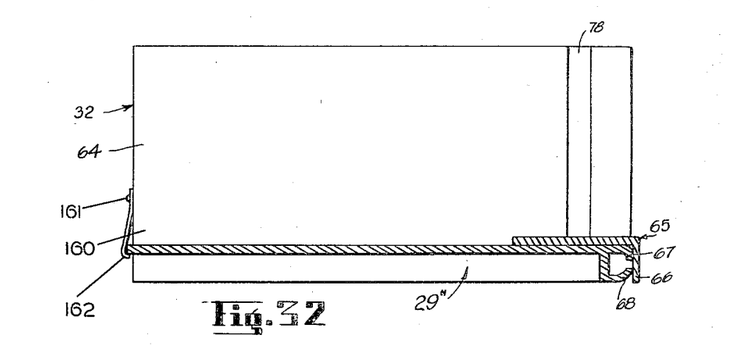
Figure 32 is a view similar to Figure 28 showing another form of means for fastening the upright partition to the shelf.

In Figure 32 I have shown a modified form of fastener for holding the upright wood partition member or spacer 64 to the upper surface of the adjacent refrigerated shelf 29''. This fastener comprises a spring clip 160 fixed at 161 to the rear end of the wood partition member and formed at its lower end at 162 to snap over a rearwardly extending flange at the rear end of the top of the refrigerated shelf.

Figure 36:
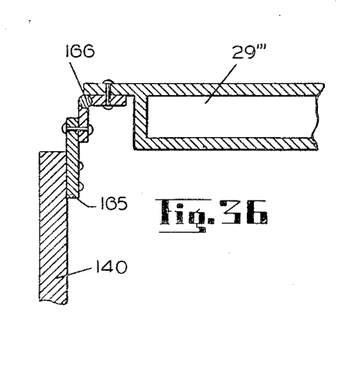
Figure 36 is a fragmentary vertical section showing one form of a part of the unit seal where the door for the underlying compartment is beneath the bottom shelf.

If the bottom refrigerated shelf 29''' (Figure 36) is above the adjacent door 140 for the compartment underlying the compartment in which the refrigerated shelf unit is disposed, I preferably provide a seal between the front end of the bottom of the refrigerated shelf unit and the door 140. One suitable form of such seal comprises, as shown in Figure 36, a sealing strip 165 secured to the front end of the refrigerated shelf unit 29''', for example by a spring clip 166 or hinged joint. The spring clip 166 or hinged joint acts to press the sealing strip 165 against the inner surface of the adjacent door 140 to complete the seal about the front end of the shelf unit.

Figure 4:
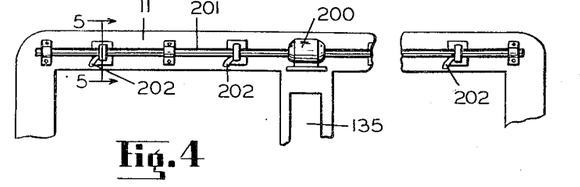
Figure 4 is a fragmentary front elevational view of the canopy, showing means for drawing air across the open front of the case further to reduce any tendency toward circulation of air into the refrigerated part of the case.
Figure 5:
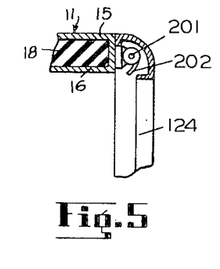
Figure 5 is a fragmentary vertical detail section taken on the line 5—5 of Figure 4.

In Figure 4 I have shown a motor 200 mounted, for example, on the front end of the top wall of the insulating housing of the case. This motor has a shaft 201 which operates suction devices 202 for drawing air across the open front ends of the refrigerated shelf compartments further to reduce any tendency toward circulation of air into the refrigerated part of the case.

In Figure 7 I have shown ratchets 205 on the shafts 43 and cooperating pawls 206 for holding the shelves or cold plates 29 in any of the positions to which they are adjusted.

The upturned ends 91 of the package stops 86 may be hinged at their lower ends to the outturned portions 90 in a manner to permit the upright ends 91 to be swung to or toward horizontal position so that the rearwardly extending package compartment may be refilled with packages from the front of the case without removing the stops 86.

If desired, the refrigerator unit comprising compressor, condenser, fan and the like may, within the scope of the present invention, be made as a unitary part of the refrigerated shelf assembly, with suitable insulation separating it from the shelf or cold plate assembly. One contemplated arrangement is to mount the refrigerator unit on the top of the unitary refrigerated shelf assembly with an insulating wall between it and the shelf assembly in a manner to permit removal and replacement of the refrigerator mechanism as a unit. In this way when servicing of the refrigerator unit or shelf assembly is required, the unitary assembly may be removed from the case and replaced by another assembly while the removed assembly is sent to the place of service for the desired attention.

I also contemplate the provision of plastic buttons or other indicators, for example, on the front ends of the sidewise and vertically adjustable partitions for indicating when any of the package compartments is empty or when there are only a few packages remaining in such compartment. This indicator means may be in the form of a button colored red, and moved by the package follower or spring to projecting position from the front end of the partition for the purposes described.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In a refrigerated display case, in combination, an outer housing having a heat insulated wall structure, a refrigerated shelf unit comprising a plurality of refrigerated shelves and adapted to be made up complete in a unitary assembly outside said housing and to be shipped independently of the housing and inserted as a completed unit into said housing, cooperating angle members within said outer housing and on said shelf unit engageable by the act of sliding said shelf unit into said housing to support said shelf unit in said housing, and means forming a part of said unitary assembly for adjusting said shelves vertically relative to each other to adjust the vertical spacing of said shelves.

2. In a refrigerated display case, in combination, an outer housing having a heat insulated wall structure, a refrigerated shelf unit comprising a plurality of flexibly interconnected refrigerated shelves and adapted to be made up and the flexible interconnections completed in a unitary assembly outside said housing and to be shipped independently of the housing and inserted as a completed unit into said housing, means within said outer housing for receiving and supporting said shelf unit in said housing, and means forming a part of said unitary assembly for adjusting said shelves vertically relative to each other to adjust the vertical spacing of said shelves, said adjusting means being disposed wholly along the lateral sides of the shelves.

3. A refrigerated shelf unit for a refrigerated display case comprising a plurality of flexibly interconnected refrigerated shelves and adapted to be made up complete in a unitary assembly outside the case and to be shipped independently of the case and inserted as a completed unit into the case, and gear and rack means forming a part of said unitary assembly for adjusting said shelves vertically relative to each other to adjust the vertical spacing of said shelves.

4. In a refrigerated display case, in combination, an outer housing having a heat insulated wall structure, a refrigerated shelf unit comprising a plurality of vertically spaced and horizontally extending shelves having means for circulating a refrigerant within said shelves and flexible tubes interconnecting the refrigerant circulating means of the respective shelves, said shelf unit being adapted to be made up and the flexible tube connections completed outside said housing and to be shipped independently of the housing and inserted as a completed unit into said housing, translationally engageable means within said outer housing for receiving and supporting said shelf unit in said housing, and means for adjusting said shelves vertically relative to each other to adjust the vertical spacing of said shelves.

5. In a refrigerated display case, in combination, an outer housing having a heat insulated wall structure, a plurality of vertically spaced and horizontally extending refrigerated shelves for supporting packages in rearwardly extending rows in said housing, said shelves having means for circulating a refrigerant therethrough, flexible tubes interconnecting the refrigerant circulating means of said shelves, and means for independently adjusting said shelves vertically relative to each other to adjust the vertical spacing of said shelves.

6. In a refrigerated display case, in combination, an outer housing having a heat insulated wall structure, a plurality of vertically spaced and horizontally extending refrigerated shelves for supporting packages in rearwardly extending rows in said housing, said shelves having means for circulating a refrigerant therethrough, flexible tubes interconnecting the refrigerant circulating means of said shelves, means for adjusting said shelves vertically relative to each other to adjust the vertical spacing of said shelves, and upright partition means extending vertically between said vertically spaced adjacent shelves and adjustable sidewise of the case.

7. In a refrigerated display case, in combination, an outer housing having a heat insulated wall structure, a plurality of vertically spaced and horizontally extending refrigerated shelves for supporting packages in rearwardly extending rows in said housing, said shelves having means for circulating a refrigerant therethrough, flexible tubes interconnecting the refrigerant circulating means of said shelves, means for adjusting said shelves vertically relative to each other to adjust the vertical spacing of said shelves, upright partition means extending vertically between said shelves, said partition means comprising upwardly extending partition walls secured to the lower shelves to permit the aforesaid vertical adjustment of the shelves and adjustable sidewise of the shelves, and facing members having interlocking and vertical sliding engagement with the forward ends of said partition walls and fastened to the overlying shelves.

8. A refrigerated shelf unit for a refrigerated display case comprising a plurality of vertically spaced and horizontally extending refrigerated shelves for supporting packages in rearwardly extending rows in the case, said shelves having means for circulating a refrigerant therethrough, flexible tubes interconnecting the refrigerant circulating means of said shelves, means for adjusting said shelves vertically relative to each other to adjust the vertical spacing of said shelves, upright partition means extending vertically between said shelves, said partition means comprising upwardly extending partition walls secured to the lower shelves to permit the aforesaid vertical adjustment of the shelves and adjustable sidewise of the shelves, and facing members having interlocking and vertical sliding engagement with the forward ends of said partition walls and fastened to the overlying shelves.

9. In a refrigerated display case, in combination, a plurality of vertically spaced and horizontally extending refrigerated shelves for supporting packages in rearwardly extending rows, upright partition means extending vertically between the shelves to form with said shelves a plurality of rearwardly extending package compartments, and stop means removably mounted on the front ends of said shelves for adjustment sidewise of the shelves and adapted to stop the foremost ends of the foremost packages in position extending from the front ends of the partition means to permit the foremost ends of the packages to be grasped and conveniently removed from the case.

10. A refrigerated shelf unit for a refrigerated display case comprising a framework having means adjacent the top thereof adapted to permit slipping the unit into cooperation with means for supporting the unit within the case, a plurality of vertically spaced and horizontally extending refrigerated shelves for supporting packages in rearwardly extending rows in said housing, said shelves having means for circulating a refrigerant therethrough, flexible tubes interconnecting the refrigerant circulating means of said shelves, means for adjusting said shelves vertically relative to each other to adjust the vertical spacing of said shelves, and upright partition means extending vertically between said shelves and adjustable sidewise of the case.

11. In combination, a plurality of vertically spaced refrigerated shelves, flexible refrigerant connections connecting said shelves, upright partitions between said shelves and adjustable sidewise of the case, and package stops removably mounted on the front ends of said shelves and adjustable sidewise of the case.

12. In combination, a plurality of vertically spaced refrigerated shelves, flexible refrigerant connections connecting said shelves, upright partitions between said shelves and adjustable sidewise of the case, package stops removably mounted on the front ends of said shelves and adjustable sidewise of the case, and facing members mounted on the front ends of said partitions and adjustable vertically with the vertical adjustment of the shelves.

13. A refrigerated shelf unit for a refrigerated display case comprising a plurality of refrigerated shelves and adapted to be made up complete in a unitary assembly outside the case and to be shipped independently of the case and inserted as a completed unit into the case, and a unit seal carried by said shelf unit, disposed marginally of said unit and cooperable with the case upon insertion of the unit into the case.

14. In a refrigerated display case, in combination, an outer housing having a heat insulated wall structure, a pair of compartments having the fronts thereof normally open and positioned directly before the customer, an insulating partition extending vertically between said compartments and thermally insulating the compartments from each other to permit different temperatures in said compartments, a pair of refrigerated shelf units adapted to be made up complete in unitary assemblies outside said housing and to be shipped independently of the housing and inserted as completed units into said compartments, means within said outer housing for receiving and supporting said shelf units in said compartments, and unit seals disposed marginally on said shelf units and cooperable with the case upon insertion of the units into said compartments.

15. A refrigerated shelf having top and bottom surfaces, refrigerant circulating means between the top and bottom surfaces of said shelf, shelf adjusting shafts extending along and carried by the sides of said shelf, a connecting shaft extending along and carried by the rear end of said shelf, the outer end of at least one of said shafts being of a character for engagement by a crank member for turning said shaft, and shelf adjusting pinions on said first mentioned shafts.

16. A refrigerated shelf unit for a refrigerated display case comprising a plurality of refrigerated shelves and adapted to be made up complete in a unitary assembly outside the case and to be shipped independently of the case and inserted as a completed unit into the case, and a bottom refrigerated plate-like member hinged along one margin to said shelf unit and adapted to be swung into position suspended from said shelf unit and adjacent a vertical wall of a compartment beneath the shelf unit when said shelf unit is in place in the case.

17. In a refrigerated display case, in combination, an outer housing having a heat insulated wall structure, a plurality of refrigerated shelves in said case, vertically extending racks adjacent margins of said shelves, and pinions carried by said shelves and meshing with said racks for supporting the shelves and adjusting same vertically.

18. In a refrigerated display case, in combination, an outer housing having a heat insulated wall structure, a plurality of refrigerated shelves in said case, a pair of racks extending vertically along the shelves at one side thereof and spaced apart rearwardly of the case, a rack extending vertically along the shelves at the other side thereof in position intermediate the rearward spacing of said first mentioned racks, and pinions carried by said shelves and meshing with said racks to provide three point supports for said shelves and for adjusting the shelves vertically.

19. In a refrigerated display case, in combination, an outer housing having a heat insulated wall structure, a plurality of refrigerated shelves in said case, a pair of racks extending vertically along the shelves at one side thereof and spaced apart rearwardly of the case, a rack extending vertically along the shelves at the other side thereof in position intermediate the rearward spacing of said first mentioned racks, pinions carried by said shelves and meshing with said racks to provide three point supports for said shelves and for adjusting the shelves vertically, and means accessible to turn said pinions from the front of the case.

20. A refrigerated shelf unit for a refrigerated display case comprising a framework, a plurality of refrigerated shelves, racks carried by said framework and extending vertically adjacent margins of said shelves, pinions carried by said shelves and meshing with said racks for supporting the shelves and adjusting same vertically, and flexible connections between the refrigerated shelves.

21. A refrigerated shelf unit for a refrigerated display case comprising a framework, a plurality of refrigerated shelves, racks carried by said framework and extending vertically adjacent margins of said shelves, pinions carried by said shelves and meshing with said racks for supporting the shelves and adjusting same vertically, flexible connections between the refrigerated shelves, partitions extending vertically between the shelves and adjustable sidewise of the shelves, and package stops mounted for removal and adjustment sidewise along the front ends of the shelves, said refrigerated shelf unit being adapted to be made up complete in a unitary assembly outside the case and to be shipped independently of the case and inserted as a complete unit into the case.

22. A refrigerated shelf unit for a refrigerated display case comprising a framework, a plurality of refrigerated shelves, racks carried by said framework and extending vertically adjacent margins of said shelves, shafts carried by and extending along the sides of said shelves, pinions carried by said shafts and meshing with said racks for supporting the shelves and adjusting same vertically, brackets carried by said shafts, and rollers carried by said brackets and cooperating with the outer sides of said racks.

EDWARD F. BRILL.

REFERENCES CITED

The following references are of record in the file of this patent:

UNITED STATES PATENTS

| Number | Name | Date |
| --- | --- | --- |
| 1,751,317 | Gail | Mar. 18, 1930 |
| 1,924,225 | Yamane | Aug. 29, 1933 |
| 1,929,952 | Limpert | Oct. 10, 1933 |
| 2,257,925 | Vretman | Oct. 7, 1941 |
| 2,280,133 | Sundbach | Apr. 21, 1942 |
| 2,299,347 | Rifkin | Oct. 20, 1942 |
| 2,408,154 | Stone | Sept. 24, 1946 |